United States Patent
Nagao

(10) Patent No.: US 8,683,371 B2
(45) Date of Patent: Mar. 25, 2014

(54) SCREEN CREATING SYSTEM OF PROGRAMMABLE DISPLAY AND SCREEN CREATING PROGRAM THEREOF

(75) Inventor: Tomoyuki Nagao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/702,853

(22) PCT Filed: Jun. 8, 2010

(86) PCT No.: PCT/JP2010/003794
§ 371 (c)(1),
(2), (4) Date: Dec. 7, 2012

(87) PCT Pub. No.: WO2011/154989
PCT Pub. Date: Dec. 15, 2011

(65) Prior Publication Data
US 2013/0086524 A1    Apr. 4, 2013

(51) Int. Cl.
*G06F 3/048* (2013.01)

(52) U.S. Cl.
USPC .......................................................... 715/772

(58) Field of Classification Search
USPC .................. 715/772, 822, 765, 771
See application file for complete search history.

(56) References Cited

U.S. PATENT DOCUMENTS

| | | | | |
|---|---|---|---|---|
| 6,184,880 B1 * | 2/2001 | Okada | ............................ | 715/704 |
| 2003/0184546 A1 * | 10/2003 | Kitamura | ...................... | 345/426 |
| 2010/0007623 A1 | 1/2010 | Kaneko et al. | | |
| 2011/0091101 A1 * | 4/2011 | Cote et al. | ...................... | 382/167 |
| 2011/0202901 A1 * | 8/2011 | Givoni et al. | .................. | 717/125 |

FOREIGN PATENT DOCUMENTS

| | | | |
|---|---|---|---|
| JP | 10097415 | A | 4/1998 |
| JP | 10198586 | A | 7/1998 |
| JP | 11134158 | A | 5/1999 |
| JP | 2001022565 | A | 1/2001 |
| JP | 2001067208 | A | 3/2001 |
| JP | 2004362258 | A | 12/2004 |
| JP | 2005293607 | A | 10/2005 |
| JP | 2006099573 | A | 4/2006 |
| JP | 2008299816 | A | 12/2008 |
| JP | 2009015405 | A | 1/2009 |
| JP | 2010097441 | A | 4/2010 |

OTHER PUBLICATIONS

International Search Report dated Sep. 7, 2010 issued in International Application No. PCT/JP2010/003794 (PCT/ISA/210).
International Preliminary Report on Patentability dated Aug. 17, 2011 issued in International Application No. PCT/JP2010/003794 (PCT/IPEA/409).
German Office Action issued Aug. 30, 2013, in corresponding Application No. 11 2010 005 645.5.

* cited by examiner

Primary Examiner — Thanh Vu
(74) Attorney, Agent, or Firm — Sughrue Mion, PLLC

(57) ABSTRACT

A screen creating system including: a display unit that displays a drawing screen; a property-information managing unit that manages property information of components configuring the drawing screen; and a list display unit configured to acquire the property information of a component selected by a user from the property-information managing unit, display the acquired property information of the component on the display unit, and edit a predetermined setting item of setting items configuring the displayed property information.

5 Claims, 10 Drawing Sheets

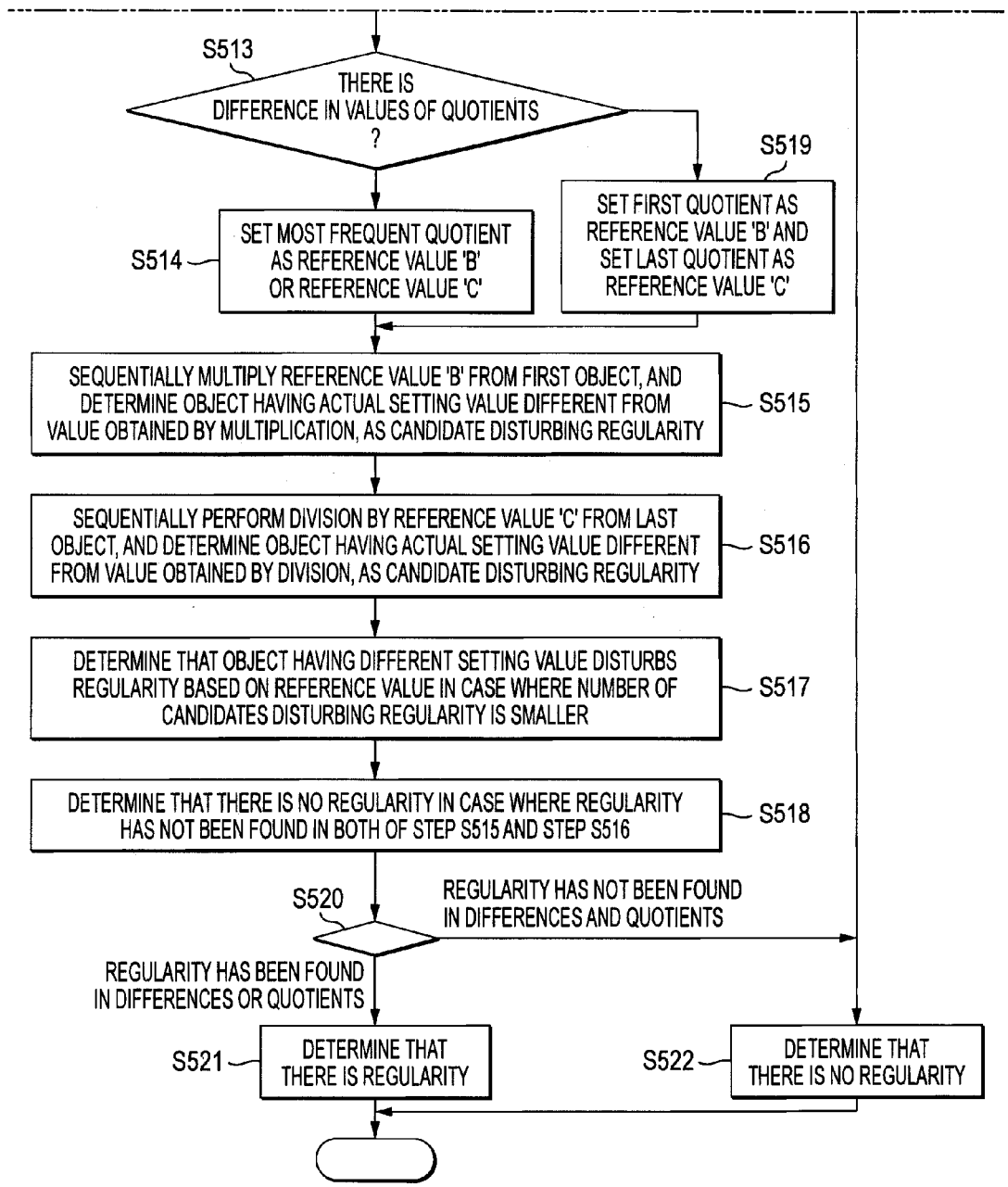

SCREEN CREATING SYSTEM OF PROGRAMMABLE DISPLAY AND SCREEN CREATING PROGRAM THEREOF

TECHNICAL FIELD

The present invention relates to a screen creating system of a programmable display, particularly, a system for separately setting settings for a plurality of components, and a screen creating program of the screen creating system.

BACKGROUND ART

In general, a screen of a programmable display is configured by components (hereinafter referred to as objects) representing the states of external devices connected to the programmable display, objects for outputting specific instructions to the external devices, etc. In other words, the screen of the programmable display is configured by various objects. These individual objects have various properties such as coordinate information of the objects, a border color, an internal color, and an address information of an external device to be referred to, and a screen creating person (user) needs to separately set the these properties.

According to the conventional art, it is possible to change the same property of a plurality of objects at once, or to list all object information on a screen and separately change the plurality of objects based on the all object information that is listed (see Patent Documents 1 and 2 for instance).

CITATION LIST

Patent Document

Patent Document 1: JP-A-2001-67208 (page 3 and FIG. 2)
Patent Document 2: JP-A-H11-134158 (page 2 and FIG. 1)

DISCLOSURE OF THE INVENTION

Problems that the Invention is to Solve

However, according to screen creating systems of the conventional art, a screen creating person needs to carry out screen creation while memorizing created states, such as how many objects have been created and where a setting value is up to, during the screen creation. Also, in a case of setting values representing a property to a plurality of objects, it is possible only to set a common value. Therefore, in order to assign consecutive or random setting values to the plurality of objects, according to the conventional art, the screen creating person should select an object from the plurality of objects every time and set setting values one by one from a setting screen of the selected object. Further, in a case of correcting a setting value of an object, it is necessary to search for the object to be corrected based on coordinate values or a name. Therefore, if a plurality of objects exists in a screen, it is difficult to select the object which needs to be corrected.

The present invention was made to solve the above-mentioned problems, and an object of the present invention is to display a list of all of the setting values representing the properties of objects which need to be set and highlight portions having different setting values or portions disturbing regularity, thereby making it easy to find an omission of setting or an error of setting. Another object of the present invention is to enable visually grasping positional relation between the list of all of the setting values and the objects on a screen, thereby preventing an error in a portion to be set.

Means for Solving the Problems

A screen creating system of the present invention for creating a screen to be displayed on a programmable display includes: a display unit that displays a drawing screen; a property-information managing unit that manages property information of components configuring the drawing screen; a list display unit configured to acquire the property information of a component selected by a user from the property-information managing unit, display the acquired property information of the component on the display unit, and edit a predetermined setting item of setting items configuring the displayed property information; and a regularity determining unit that compares values of adjacent setting items configuring the property information and determines where there is regularity in which differences or quotients between the values are the same value, and in a case of determining that there is the regularity in the adjacent setting items, instructs the list display unit to highlight the setting item having the regularity on the display unit, wherein the list display unit transmits the acquired property information of the component to the regularity determining unit and operates based on the instruction from the regularity determining unit.

Advantage of the Invention

According to the present invention, since all of the setting values of the objects which need to be set are displayed in a list, during editing, it is unnecessary to memorize a working state. Also, since portions having different setting values or portions disturbing regularity are highlighted, it is easy to find an omission in setting or an error in setting, and influence on the subsequent processes is suppressed. Further, since it is possible to visually grasp a positional relation between the list of all of the setting values and the objects on the screen, it is possible to prevent an error in a portion to be set.

BEST MODE FOR CARRYING OUT THE INVENTION

First Embodiment

Figure 1:
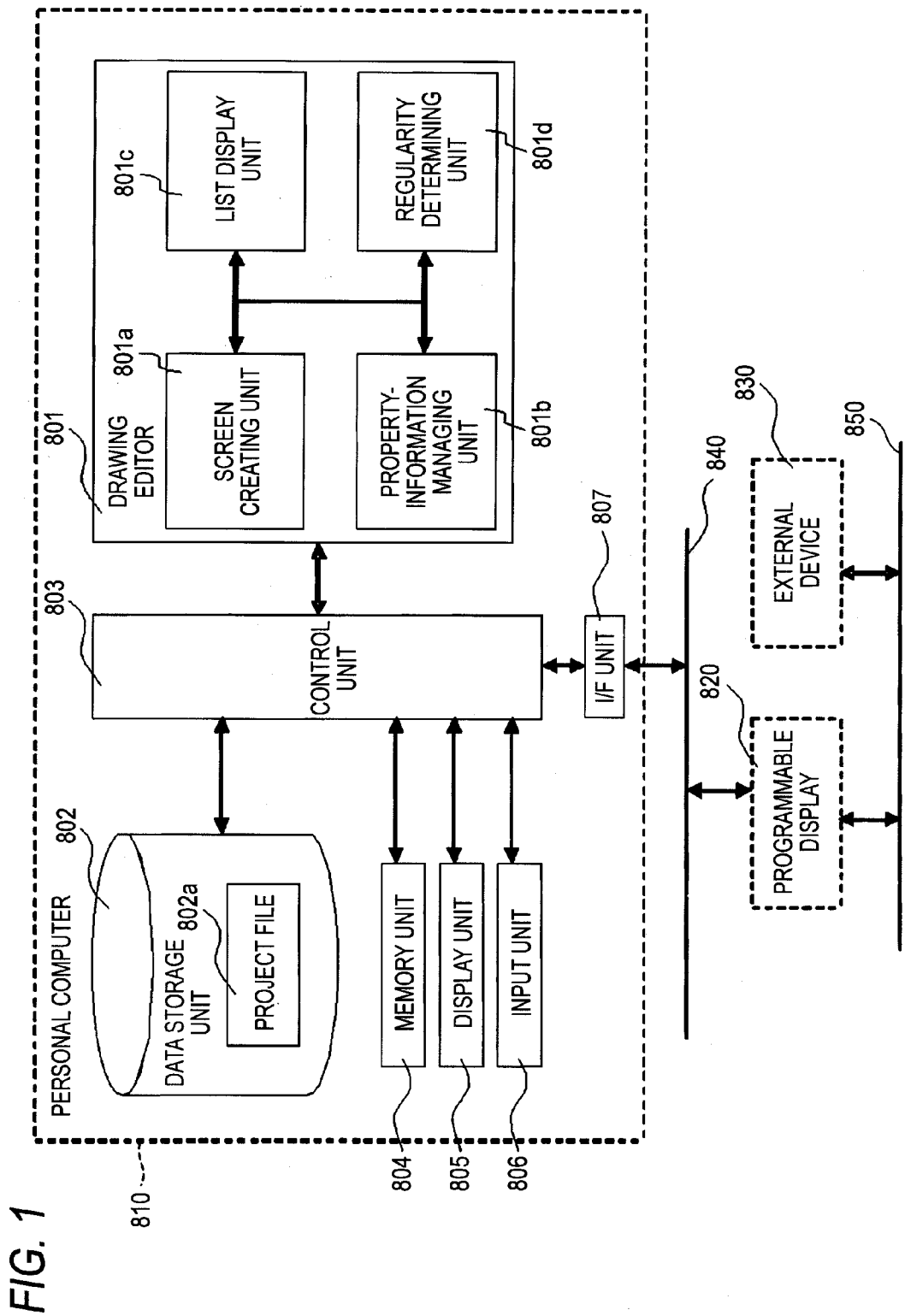
FIG. 1 is a view illustrating a configuration of a screen creating system of a programmable display according to a first embodiment of the present invention.

FIG. 1 is a view illustrating a configuration of a screen creating system for creating a screen to be displayed on a programmable display according to a first embodiment of the present invention. In FIG. 1, reference numeral 810 denotes a personal computer for creating drawing data, reference numeral 801 denotes a drawing editor, reference numeral 802 denotes a data storage unit, reference numeral 803 denotes a control unit, reference numeral 804 denotes a memory unit, reference numeral 805 denotes a display unit, reference numeral 806 denotes an input unit, and reference numeral 807 denotes an interface unit (hereinafter, abbreviated as an I/F unit). The personal computer 810 includes the drawing editor 801, the data storage unit 802, the control unit 803, the memory unit 804, the display unit 805, the input unit 806, and the I/F unit 807. A reference symbol 802a denotes a project file stored in the data storage unit 802.

Reference numeral 820 denotes a programmable display, reference numeral 830 denotes an external device, and reference numerals 840 and 850 denote communication channels. The personal computer 810 and the programmable display 820 are connected to each other through the communication channel 840, and the external device 830 and the programmable display 820 are connected to each other through the communication channel 850.

A reference symbol 801a denotes a screen creating unit for implementing a drawing screen and displaying objects on the display unit 805, a reference symbol 801b denotes a property-information managing unit for managing property information of the objects, a reference symbol 801c denotes a list display unit for displaying setting values (setting items) representing properties of the objects, performing highlighting, or displaying an emphasis icon to be described below, on the display unit 805, and a reference symbol 801d denotes a regularity determining unit for determining whether to perform the highlighting. The drawing editor 801 includes the screen creating unit 801a, the property-information managing unit 801b, the list display unit 801c, and the regularity determining unit 801d.

Next, the operation of the personal computer 810 will be described. The control unit 803 calls an operating system stored in advance in the memory unit 804, activates the operating system, and executes the drawing editor 801, which is an application program, on the activated operating system. The personal computer 810 makes the control unit 803 execute the drawing editor 801, thereby functioning as a screen creating system.

Next, the operation of the drawing editor 801 will be described. The drawing editor 801 has a function of creating screen data which the programmable display 820 will use for image display or control on the external device 830. First, the screen creating unit 801a makes the display unit 805 display objects represented by the project file 802a stored in the data storage unit 802, based on the project file 802a.

The list display unit 801c acquires the property information of objects selected through the input unit 806 by a screen creating person from the property-information managing unit 801b, and transmits the acquired property information to the regularity determining unit 801d. The regularity determining unit 801d determines whether there is regularity in the received property information. If determining that highlighting is necessary, the regularity determining unit 801d sets highlighting, which will be described later, and transmits the determination result to the list display unit 801c. The list display unit 801c makes the display unit 805 display the setting values representing the properties of the objects based on the received determination result and perform the highlighting.

The property-information managing unit 801b manages the kinds of the properties stored for every object type, and returns a property group according to an object type of the object instructed from the list display unit 801c to the list display unit 801c. The list display unit 801c lists the property group of each object acquired from the property-information managing unit 801b and an ID information group of the individual objects, for example, in a vertical direction and a horizontal direction, respectively, and makes the display unit 805 display the list.

The regularity determining unit 801d determines whether there is regularity in the property information received from the list display unit 801c, based on an operation procedure of FIG. 4 to be described later, and transmits the determination result to the list display unit 801c. The list display unit 801c performs highlighting or setting of an icon based on the received determination result, and makes the display unit 805 perform display.

Figure 2:
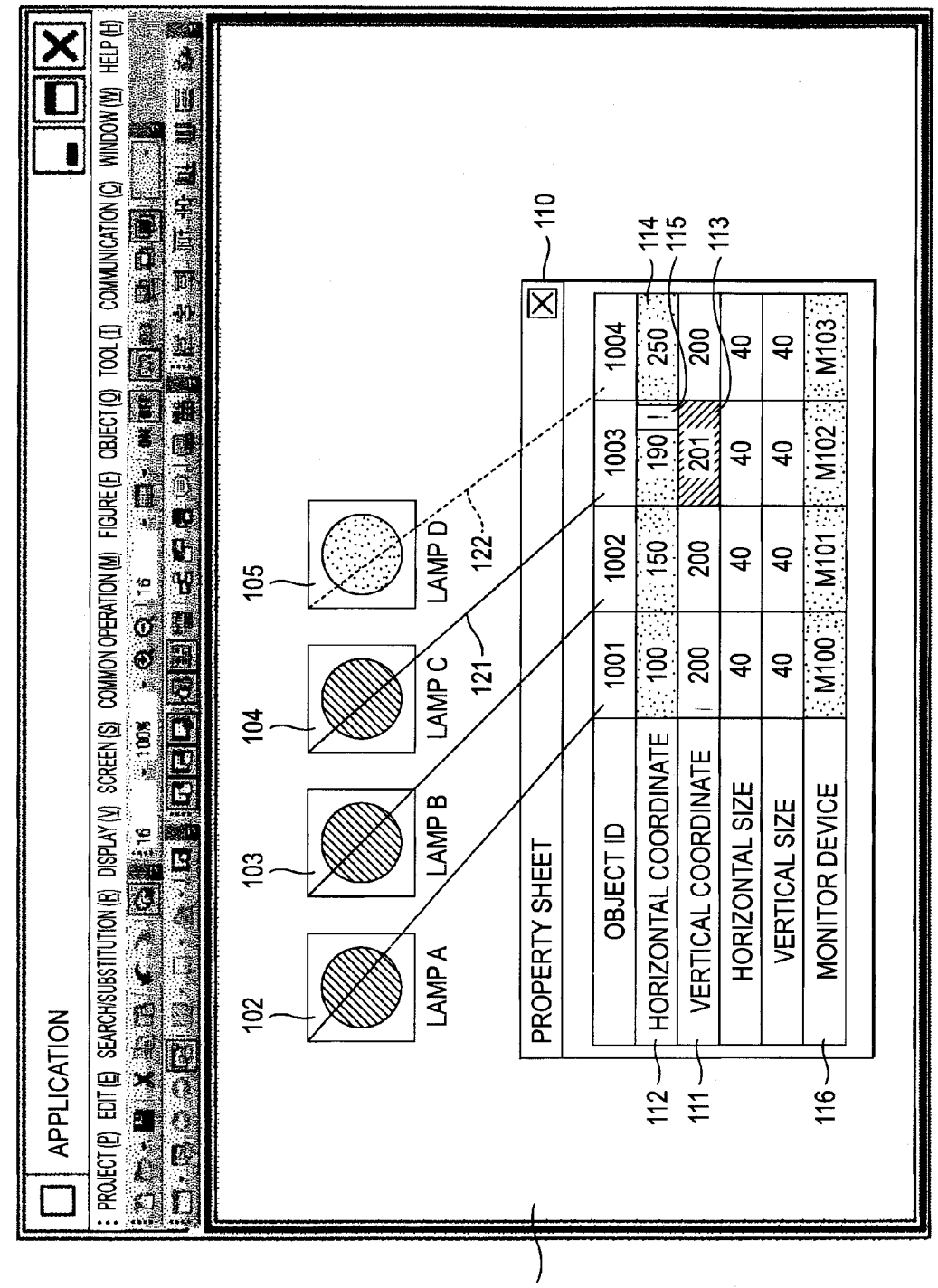
FIG. 2 shows a drawing screen of the screen creating system of the programmable display according to the first embodiment of the present invention.

FIG. 2 shows a drawing screen of the screen creating system for creating a screen to be displayed on the programmable display according to the first embodiment for carrying out the present invention. Reference numeral 101 denotes a drawing screen displayed on the display unit 805 by the screen creating unit 801a, reference numerals 102 to 105 denote objects on the drawing screen 101, and reference numeral 110 denotes a property sheet. Each of the objects 102 to 105 has been set to monitor an address representing the state of the external device 830 connected to the programmable display 820, and the information thereof is displayed as a list on the property sheet 110. Reference numerals 111 and 112 denote properties representing the coordinate position of each object, reference numerals 113 and 114 denote highlighting, and reference numeral 115 denotes an emphasis icon. Reference numeral 116 denotes a list of monitor devices which monitor the objects 102 to 105, and reference numerals 121 and 122 denote associating lines that associates the objects 102 to 105 with the property information of the objects displayed in the list of the property sheet 110. The associating lines 121 and 122 are straight or curved lines connecting the individual objects with the property information corresponding to the individual objects.

In FIG. 2, the objects 102 to 105 are arranged in the horizontal direction at almost regular intervals. However, the setting value of a property 'Horizontal Coordinate' 112 for the object 102 is 100, the setting value of the property 'Horizontal Coordinate' 112 for the object 103 is 150, the setting value of the property 'Horizontal Coordinate' 112 for the object 104 is 198, and the setting value of the property 'Horizontal Coordinate' 112 for the object 105 is 250. In other words, only the object 104 is deviated by 2 dots on the drawing screen 101. Also, the setting values of a property 'Vertical Coordinate' 111 for the objects 102, 103, and 105 are 200, and the setting value of the property 'Vertical Coordinate' 111 for the object 104 is 201. In other words, only the object 104 is deviated by 1 dot on the drawing screen 101. The operation procedure of the present invention when the screen creating person selects the four objects 102 to 105 and makes the objects be displayed on the drawing screen 101 will be described with reference to FIG. 3.

First, the screen creating person selects a plurality of objects from the objects displayed on the drawing screen 101 (STEP S401). If the plurality of objects is selected, the list display unit 801c stores the selection order of the plurality of objects selected by the screen creating person (STEP S402), and the list display unit 801c commands the property-information managing unit 801b to extract all of the property information of the plurality of selected objects, and acquires the property information (STEP S403).

Next, the list display unit 801c compares the setting values representing each of the acquired properties of the objects (STEP S404). In a case where there are uncompared setting values, ('There is uncompared property' in STEP S404), the list display unit 801c transmits the acquired setting values of each object to the regularity determining unit 801d, and the regularity determining unit 801d compares the setting values representing the properties of the plurality of selected objects (STEP S405). The regularity determining unit 801d counts the frequency of each setting value for each type of the acquired properties of the individual objects (STEP S405a), and examines whether there is regularity in the setting values (STEP S405b).

In a case where there is no regularity in all of the setting values and all of the setting values are the same, the regularity determining unit 801d determines that there is no difference ('There is no difference' in STEP S406), and proceeds to comparison between the setting values representing the next property (STEP S404). Meanwhile, in a case where there is a different setting value ('There is difference' in STEP S406), the regularity determining unit 801d extracts the most frequent setting value (hereinafter, referred to as a reference value 'A') from the different setting values (STEP S407). In a case where there is a plurality of reference values 'A' ('There is plurality of setting values having largest count values' in STEP S407), the regularity determining unit 801d determines that there is no regularity, and performs setting to highlight all of the setting values (STEP S408). In a case where there is one reference value 'A' ('There is one setting value having largest count value' in STEP S407), the regularity determining unit 801d determines that there is regularity, and performs setting for highlighting setting values other than the reference value 'A' (STEP S409).

Next, the regularity determining unit 801d examines whether there is regularity in the setting values, based on an operation procedure of FIG. 4 to be described below (STEP S410). In a case where it is determined as the examination result that there is regularity, or in a case where there is a setting value disturbing regularity in the setting values ('There is setting value disturbing regularity' in STEP S410), the regularity determining unit 801d performs setting of emphasizing different from the above-mentioned setting for highlighting, for example, setting of adding an icon (STEP S411). After completing the setting for emphasizing, the regularity determining unit 801d proceeds to comparison between the setting values representing the next property (STEP S404). In a case where it is determined as the examination result that there is no setting value disturbing the regularity ('There is no setting value disturbing regularity' in STEP S410), the regularity determining unit 801d proceeds to comparison for the next property (STEP S404).

Finally, if the comparing process on the setting values representing all of the properties finishes ('Comparison for all properties has been completed' in STEP S404), the list display unit 801c makes the display unit 805 display the setting values representing all of the properties as a list. At this time, the list display unit 801c makes the display unit 805 display the list while performing highlighting set by the comparing process (STEP S412).

The operation procedure of the regularity determining unit 801d in STEP S410 of the operation procedure described with reference to FIG. 3 will be described in detail with reference to FIG. 4.

First, in STEP S401 of the operation procedure described with reference to FIG. 3, in a case where the number of objects selected by the screen creating person is two or less, the regularity determining unit 801d determines that there is no regularity ('The number of selected objects is two or less' in STEP S501). In a case where the number of objects selected by the screen creating person is three or more ('The number of selected objects is three or more' in STEP S501), the regularity determining unit 801d calculates differences between the setting values representing the properties of every adjacent objects, and quotients between the setting values representing the properties of every adjacent objects, in the selection order of the objects (STEP S502).

Next, the regularity determining unit 801d determines whether there is a difference in all of the values of the calculated differences (STEP S503). In a case where there is no difference in all of the values of the differences, the regularity determining unit 801d counts the values of the differences like the above-mentioned reference values 'A', and sets the value of the most frequent difference as a reference value 'B' or a reference value 'C' (the reference value 'B' and the reference value 'C' are the same) (STEP S504). In a case where there is a difference in the values of the differences ('There is difference in values of differences' in STEP S503), the regularity determining unit 801d sets the first calculated difference between setting values of adjacent objects as the reference value 'B', and sets the last calculated difference between setting values of adjacent objects as the reference value 'C' (STEP S509).

Next, the regularity determining unit 801d sequentially adds the reference value 'B' from the first object, and determines an object having an actual setting value different from the value obtained by the addition, as a candidate disturbing the regularity (STEP S505). Similarly, the regularity determining unit 801d sequentially subtracts the reference value 'C' from the last object, and determines an object having an actual setting value different from the value obtained by the subtraction, as a candidate disturbing the regularity (STEP S506).

Next, the regularity determining unit 801d compares the results of STEP S505 and STEP S506 of the operation procedure, and uses a reference value of a result having a smaller number of candidates disturbing regularity. In this case, the regularity determining unit 801d determines a setting value which is a candidate disturbing regularity to a setting value which disturbs regularity (STEP S507). In a case where regularity has not been found in both of STEP S505 and STEP S506 of the operation procedure, the regularity determining unit 801d determines that there is no regularity (STEP S508).

Next, the regularity determining unit 801d determines whether there is a difference in all of the values of the calculated quotients (STEP S513). In a case where there is no difference in all of the values of the quotients, the regularity determining unit 801d counts the values of the quotients, and sets the value of the most frequent quotient as a reference value 'B' or a reference value 'C' (the reference value 'B' and the reference value 'C' are the same) (STEP S514). In a case where there is a difference in the values of the quotients ('There is difference in values of quotients' in STEP S513), the regularity determining unit 801d sets the first calculated quotient between setting values of adjacent objects as the reference value 'B', and sets the last calculated quotient between setting values of adjacent objects as the reference value 'C' (STEP S519).

Next, the regularity determining unit 801d sequentially multiplies the reference value 'B' from the first object, and determines an object having an actual setting value different from the value obtained by the multiplication, as a candidate disturbing regularity (STEP S515). Similarly, the regularity determining unit 801d sequentially performs division by the reference value 'C' from the last object, and determines an object having an actual setting value different from the value obtained by the division, as a candidate disturbing regularity (STEP S516).

Next, the regularity determining unit 801d compares the results of STEP S515 and STEP S516 of the operation procedure, and uses a reference value of a result having a smaller number of candidates disturbing regularity. In this case, the regularity determining unit 801d determines a setting value which is a candidate disturbing regularity as a setting value disturbing regularity (STEP S517). In a case where regularity has not been found in both of STEP S515 and STEP S516 of the operation procedure, the regularity determining unit 801d determines that there is no regularity (STEP S518).

Finally, in a case where regularity has been found in the calculated differences or quotients ('Regularity has been found in differences or quotients' in STEP S520), the regularity determining unit 801d determines that there is regularity (STEP S521). In a case where regularity has not been found in the calculated differences and quotients ('Regularity has not been found in differences and quotients' in STEP S520), the regularity determining unit 801d determines that there is no regularity (STEP S522).

The operation procedures described with reference to FIGS. 3 and 4 will be described by taking the drawing screen 101 shown in FIG. 2, as an example. In FIG. 2, for example, if comparison for the property 'Vertical Coordinate' 111 is performed, three objects 102, 103, and 105 of the four objects 102, 103, 104, and 105 have setting values of 200, and only the object 104 has an setting value of 201.

Figure 3:
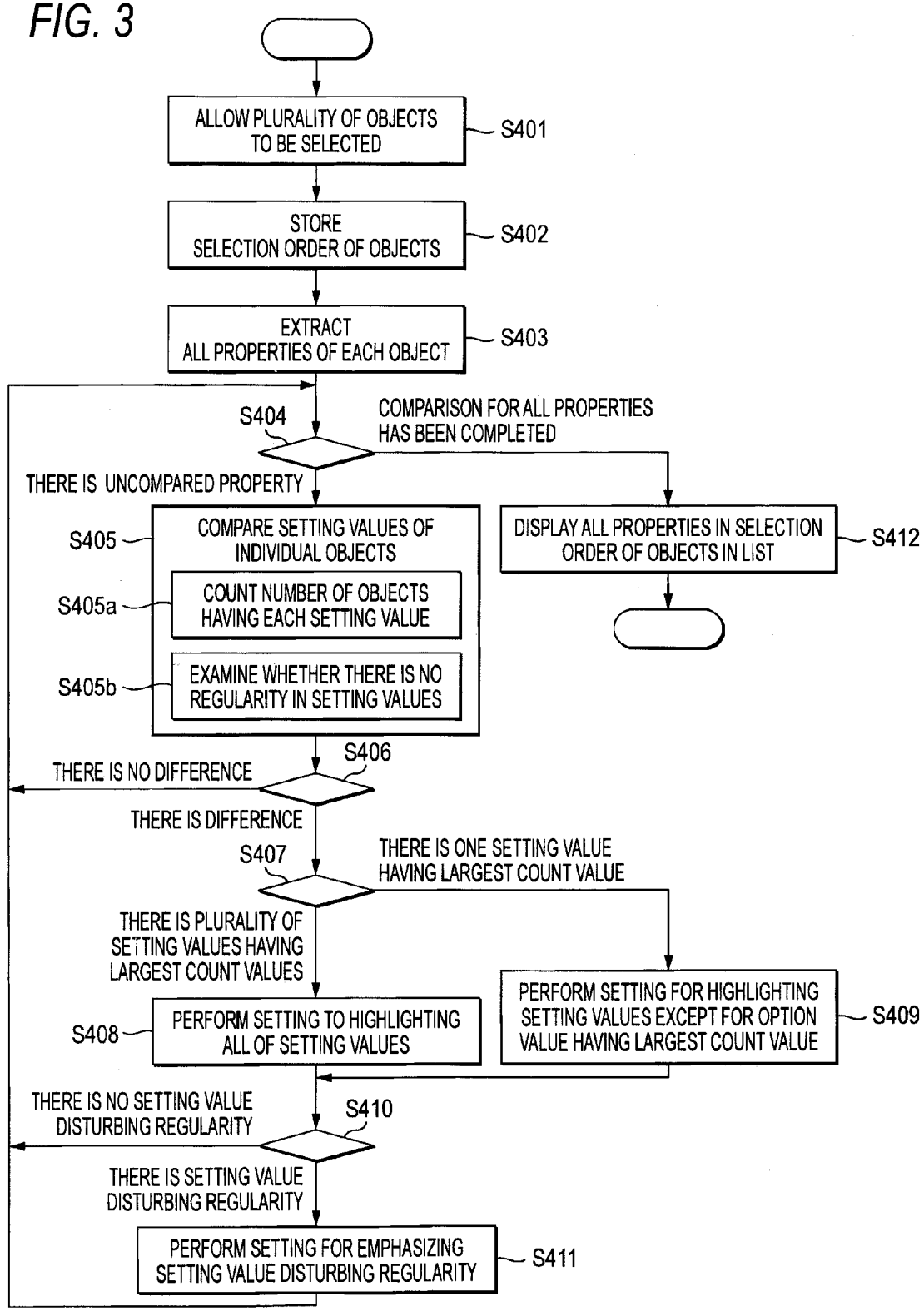
FIG. 3 shows an operation procedure of comparison and display according to the first embodiment of the present invention.

Therefore, according to STEP S407 of FIG. 3, the setting value '200' becomes the reference value 'A', such that cells for the setting values of the objects 102, 103, and 105 are not highlighted, and only a cell for the setting value '201' of the object 104 is highlighted as shown by reference numeral 113. As a result, the screen creating person can visually find an error in setting.

In this state, if the screen creating person sets 200 for the object 104, all of the objects have the same value '200' for the property 'Vertical Coordinate' 111, the highlighting 113 is released, and a general display is restored.

Also, in FIG. 2, for example, if comparison for the property 'Horizontal Coordinate' 112 is performed, the difference between the setting value of the object 102 and the setting value of the object 103 is 50, the difference between the setting value of the object 103 and the setting value of the object 104 is 48, and the difference between the setting value of the object 104 and the setting value of the object 105 is 52. Therefore, according to the STEP S509 of FIG. 4, the reference value 'B' becomes 50, and the reference value 'C' becomes 52. In this case, it becomes clear that the reference value 'B' of 50 has established the regularity, and an emphasis icon 115 is displayed for only the object 104 out of the regularity.

Also, since there is a regularity in the setting values of the objects 102 to 105, the cell for the setting value of the object 103 is highlighted in a different way 113 from that of the highlight way 114. Similarly, in FIG. 2, the associating line 121 and the associating line 122 are shown at the display positions of the object 104 and the object 105 on the drawing screen 101.

Therefore, for example, in a case of desiring to perform setting while gradually increasing monitor devices 116 displayed in the list of the property sheet 110, in the order of the objects 102, 103, 104, and 105, the screen creating person only needs to sequentially select an object. In this case, it is possible to proceed while visually confirming the setting. Thereafter, the setting values for the property 'Horizontal Coordinate' 112 are set to the increased value '50', sequentially from the left side, whereby it is possible to easily accomplish the objects.

Figure 5:
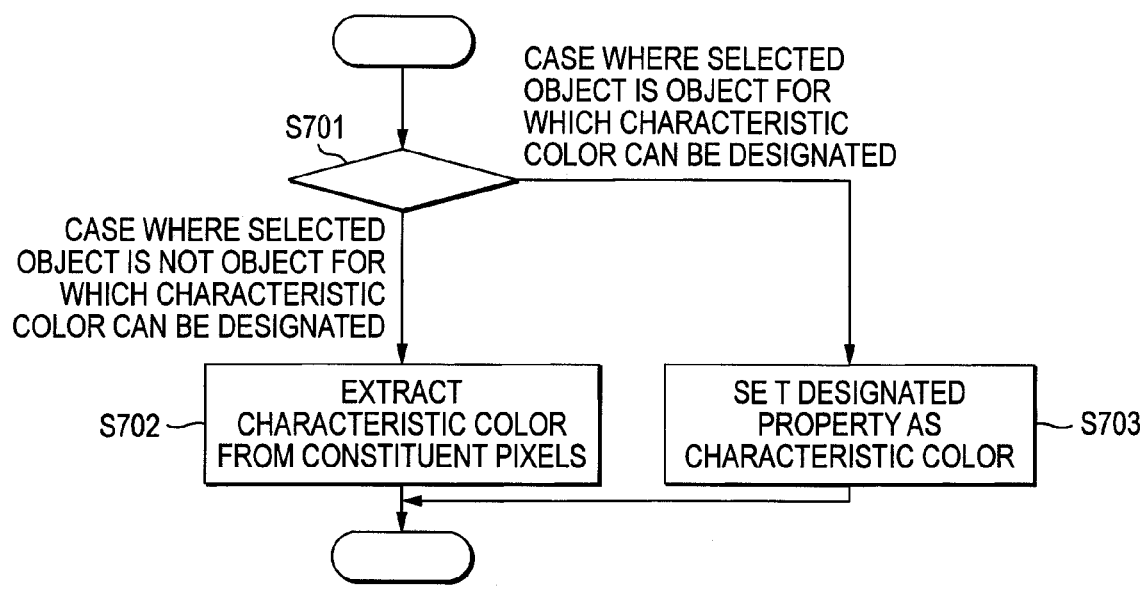
FIG. 5 shows an operation procedure of extracting a characteristic color according to the first embodiment of the present invention.

At this time, the colors of the associating line 121 and the associating line 122 are determined according to the operation procedure based on FIG. 5. In a case where a characteristic color, for example, the color of the drawing screen 101 has been set as the background color for a selected object, the screen creating person inquires of the screen creating unit 801a, having a function of colorizing the associating line 121 and the associating line 122, whether it is possible to designate the background color of the drawing screen 101 and the colors of the associating line 121 and the associating line 122 to be clearly distinguished from each other (STEP S701). In a case where the selected object is not an object for which a characteristic color can be designated ('Case where selected object is not object for which characteristic color can be designated' in STEP S701), the screen creating unit 801a extracts a characteristic color from pixels constituting the drawing screen 101, and determines and displays the characteristic color (STEP S702). Meanwhile, in a case where it is possible to designate a characteristic color ('Case where selected object is object for which characteristic color can be designated' in STEP S701), the screen creating person determines the designated color, and the screen creating unit 801a displays the designated color determined by the screen creating person as the characteristic color for the object (STEP S703).

Figure 6:
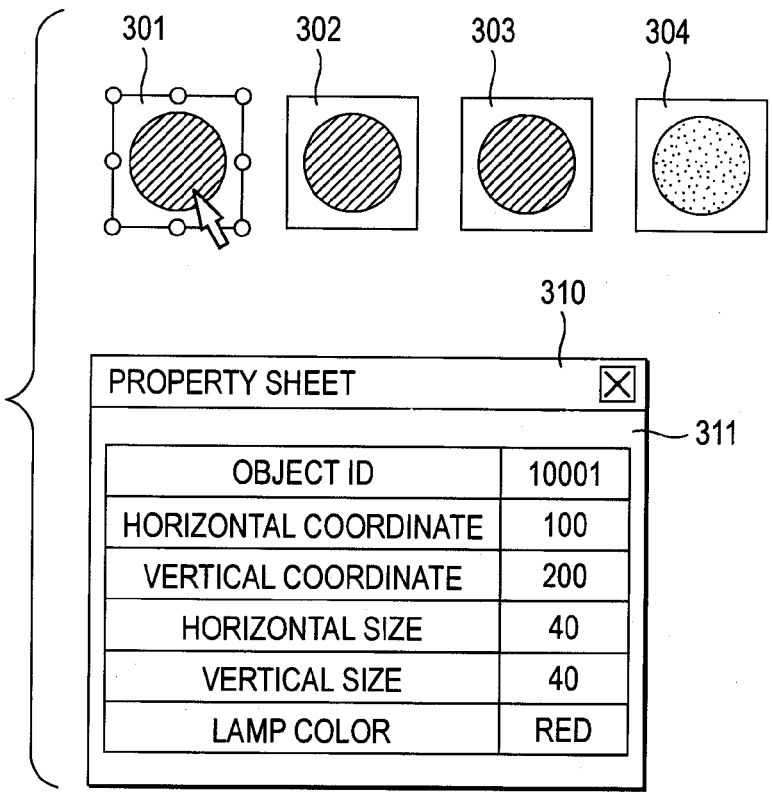
FIG. 6 shows an example of a display operation according to the first embodiment of the present invention.

FIGS. 6 to 9 show a display operation when the screen creating person selects objects one by one on the drawing screen 101 displayed on the display unit 805. First, as shown in FIG. 6, if the screen creating person selects an object 301, the property information of the object 301 is displayed in a list of a property sheet 310.

Figure 7:
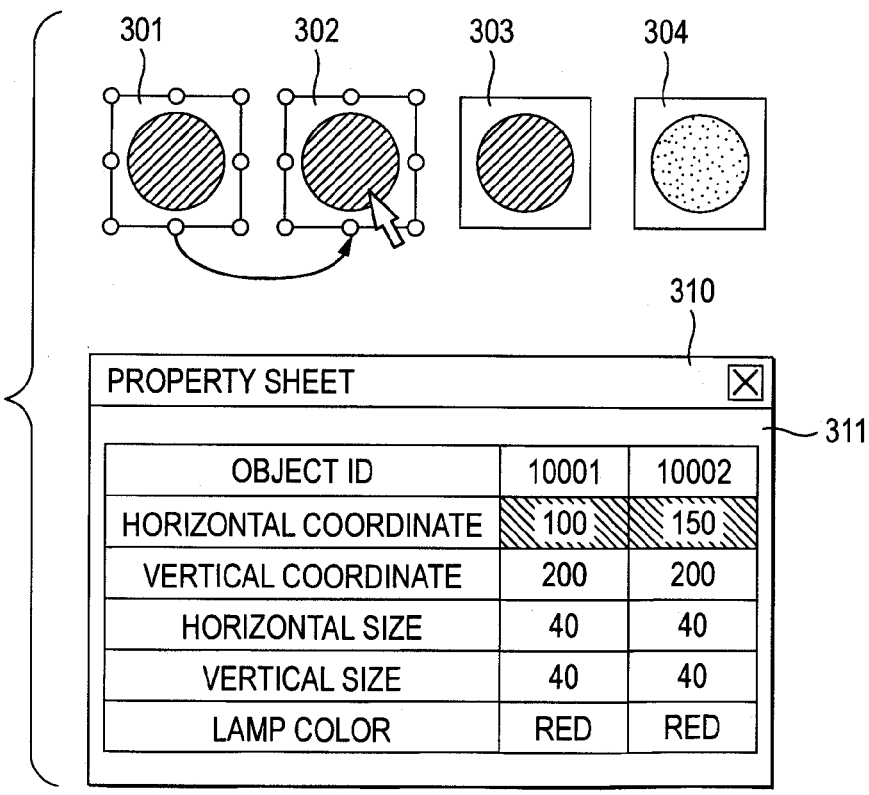
FIG. 7 shows another example of the display operation according to the first embodiment of the present invention.

Next, as shown in FIG. 7, if the screen creating person selects an object 302 disposed on the right side of the object 301 on the drawing screen 101, the property information of the object 302 is additionally displayed on the right side of the list of the property sheet 310.

In this case, the list display unit 801c compares setting values representing the object 301 and the object 302 with respect to each property. In the example of FIG. 7, since setting values relative to a property 'Horizontal Coordinate' 311 are different, the inside of a cell of each of the setting values of the object 301 and the object 302 relative to the property 'Horizontal Coordinate' 311 is highlighted.

Figure 8:
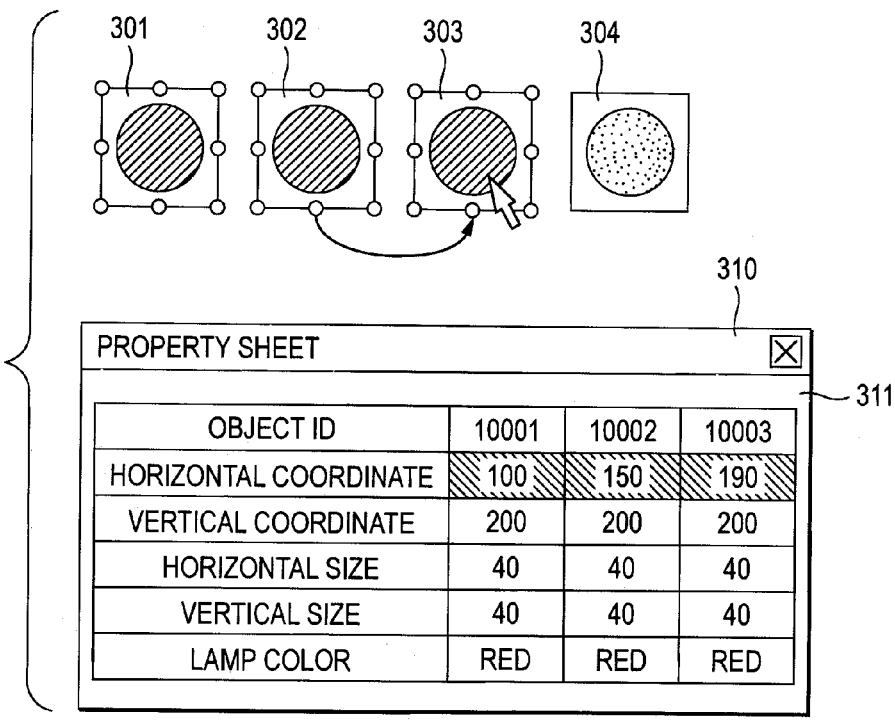
FIG. 8 shows another example of the display operation according to the first embodiment of the present invention.

Similarly, as shown in FIG. 8, if the screen creating person selects an object 303 is selected on the drawing screen 101, the inside of a cell of each of the setting values of the three objects 301 to 303 relative to the property 'Horizontal Coordinate' 311 is highlighted.

Figure 4:
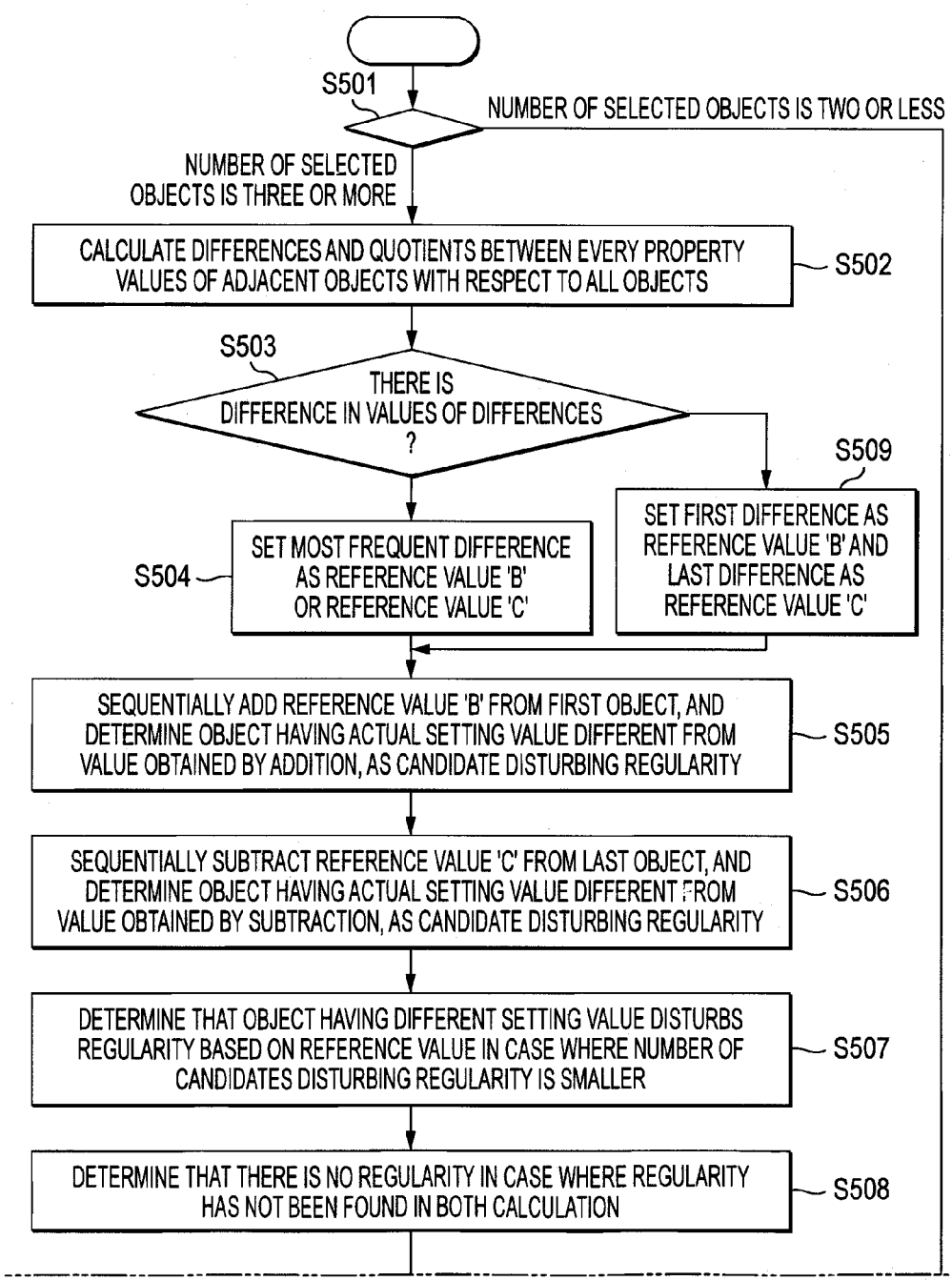
FIG. 4 shows an operation procedure of regularity determination according to the first embodiment of the present invention.
Figure 9:
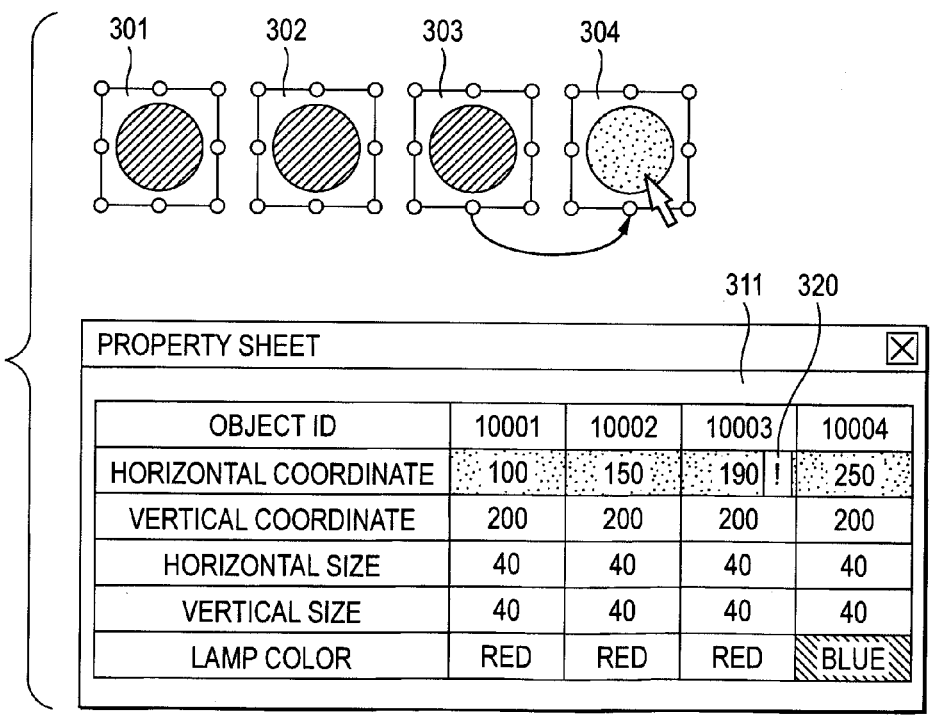
FIG. 9 shows another example of the display operation according to the first embodiment of the present invention.

Next, as shown in FIG. 9, if the screen creating person selects an object 304 on the drawing screen 101, based on the operation procedure of FIG. 4, the regularity determining unit 801d finds regularity in the property 'Horizontal Coordinate'

311, and the list display unit 801c changes an image of the highlighted property 'horizontal Coordinate' 311. However, since only the object 303 is deviated from the regularity, the list display unit 801c makes the display unit 805 display the object 303 with an additional emphasis icon 320.

Figure 10:
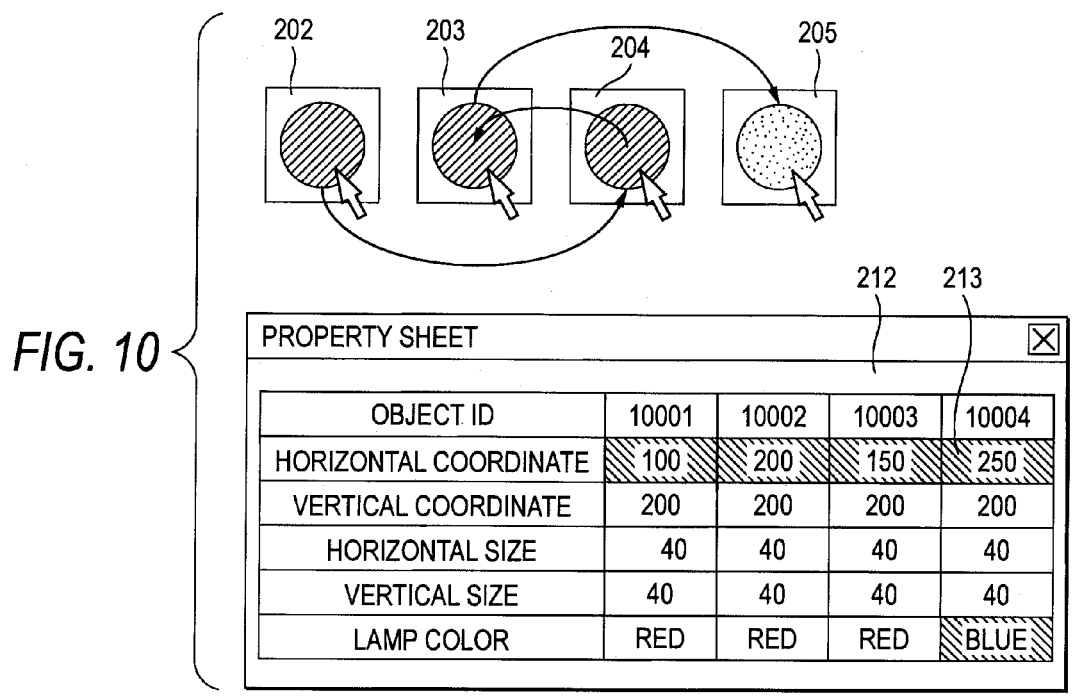
FIG. 10 shows another example of the display operation according to the first embodiment of the present invention.

FIG. 10 shows display when the objects are selected in an order different from the object selection order shown in FIGS. 6 to 9. In the example of FIG. 10, the screen creating person sequentially selects an object 202, an object 204, an object 203, and the object 205. In this case, setting values relative to a property 'Horizontal Coordinate' 212 become 100, 200, 150, and 250 sequentially from the left side, and it is not possible to find regularity in these setting values. Therefore, since the four setting values relative to the property 'horizontal Coordinate' 212 are just different, only different highlighting 213 is performed on cells for the setting values.

As described above, according to the present invention, it is possible to take a look at all of the selected objects in the selection order in a table form, and directly and separately edit the setting values representing each property. Therefore, when display on the drawing screen is performed, since a portion where there is a difference in setting values representing each property or a portion disturbing regularity are highlighted, an error in setting is easily found. Also, since the relation between the list and the position on the drawing screen is visually displayed, it is possible to set objects without errors.

Figure 11:
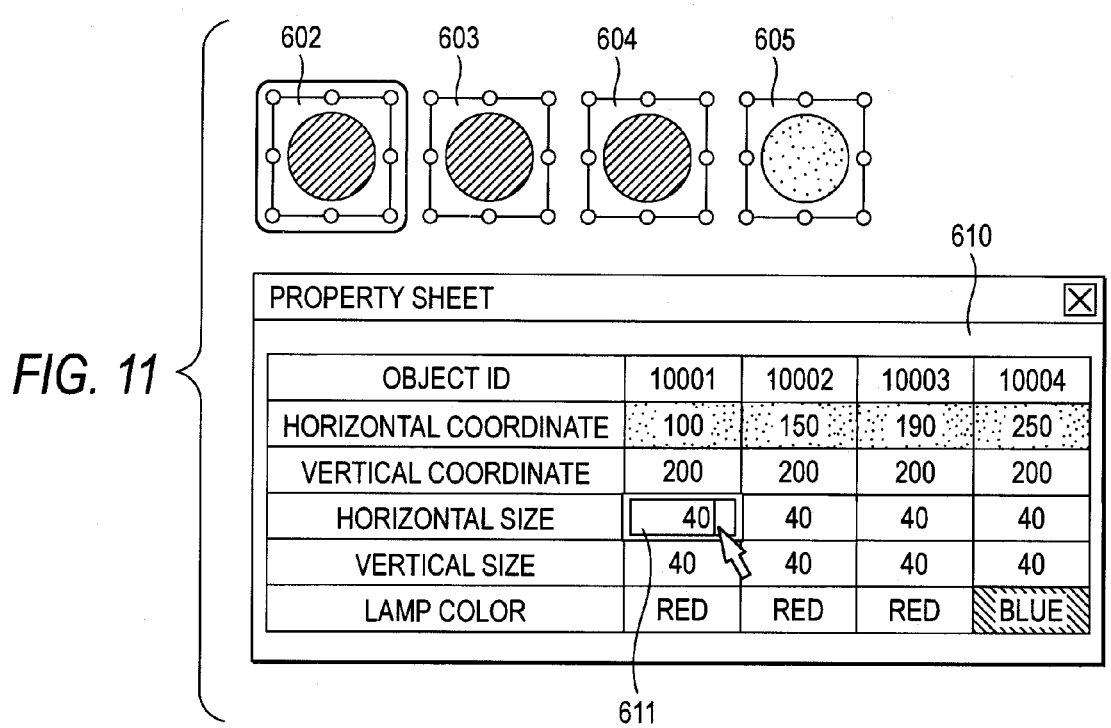
FIG. 11 shows another example of the display operation according to the first embodiment of the present invention.

FIG. 11 shows an operation when the screen creating person has selected a cell for a setting value listed in a property sheet 610. After objects 602 to 605 are selected, if the screen creating person selects a property 'Horizontal Coordinate' 611 of the object 602 in a list of the property sheet 610, the screen creating unit 801a performs highlighting on the vicinity of the object 602 to represent that the object 602 has been selected, based on a selection instruction from the screen creating person. This highlighting enables the screen creating person to confirm the position of an object to be corrected on the drawing screen 101, and makes it possible to prevent a mistake of changing an unintended object.

Also, even if the screen creating system of the present invention is implemented by a computer, the same effects can be achieved. In this case, by operating the computer as each of the above-mentioned unit, a screen creating program for implementing the screen creating system of the present invention in the computer is included in the present invention.

DESCRIPTION OF REFERENCE NUMERALS AND SYMBOLS

801 DRAWING EDITOR
801a SCREEN CREATING UNIT
801b PROPERTY-INFORMATION MANAGING UNIT
801c LIST DISPLAY UNIT
801d REGULARITY DETERMINING UNIT
805 DISPLAY UNIT
810 PERSONAL COMPUTER
820 PROGRAMMABLE DISPLAY

The invention claimed is:

1. A screen creating system for creating a screen to be displayed on a programmable display, the screen creating system comprising:
   a display unit that displays a drawing screen;
   a property-information managing unit that manages property information of components configuring the drawing screen;
   a list display unit configured to acquire the property information of a component selected by a user from the property-information managing unit, display the acquired property information of the component on the display unit, and edit a predetermined setting item of setting items configuring the displayed property information; and
   a regularity determining unit that compares values of adjacent setting items configuring the property information and determines where there is regularity in which differences or quotients between the values are the same value, and in a case of determining that there is the regularity in the adjacent setting items, instructs the list display unit to highlight a setting item having the regularity on the display unit,
   wherein the list display unit transmits the acquired property information of the component to the regularity determining unit and operates based on the instruction from the regularity determining unit.

2. The screen creating system according to claim 1,
   wherein in a case of determining the regularity in the setting items, the regularity determining unit instructs the list display unit to add an icon to an setting item which is a factor of disturbing regularity in the setting items such that the setting item is emphasized, and
   wherein the list display unit operates based on the instruction from the regularity determining unit.

3. The screen creating system according to claim 1, further comprising a screen creating unit that connects a predetermined component and a property information corresponding to the predetermined component by a straight line or a curved line, based on an instruction from the user, to associate the component configuring the drawing screen with the property information corresponding to the component on the drawing screen displayed on the display unit.

4. The screen creating system according to claim 3, wherein the screen creating unit colors the straight line or the curved line into a predetermined color based on an instruction from the user.

5. A non-transitory computer readable medium that stores a screen creating program for operating the screen creating system according to claim 1,
   wherein the screen creating program causes a computer to function as each of the above-described units.

* * * * *